United States Patent
Kivelä et al.

[19]
[11] Patent Number: 6,052,070
[45] Date of Patent: Apr. 18, 2000

[54] METHOD FOR FORMING A CHARACTER STRING, AN ELECTRONIC COMMUNICATION DEVICE AND A CHARGING UNIT FOR CHARGING THE ELECTRONIC COMMUNICATION DEVICE

[75] Inventors: Seppo Kivelä, Salo; Seppo Helle, Paimio; Risto Mört, Salo, all of Finland; Graham Thomas, Camberley, United Kingdom

[73] Assignee: Nokia Mobile Phones Ltd., Salo, Finland

[21] Appl. No.: 08/820,782

[22] Filed: Mar. 19, 1997

[30] Foreign Application Priority Data

Mar. 20, 1996 [FI] Finland .................................. 961277

[51] Int. Cl.⁷ .................................................. H04M 1/02
[52] U.S. Cl. ............................ 341/22; 341/26; 379/354; 345/168
[58] Field of Search ........................ 341/20, 22, 23, 341/26; 345/157, 160, 168; 379/368, 354

[56] References Cited

U.S. PATENT DOCUMENTS

| | | | |
|---|---|---|---|
| 4,130,738 | 12/1978 | Sandstedt | 179/90 B |
| 4,709,387 | 11/1987 | Masuda | 379/354 |
| 4,912,462 | 3/1990 | Washizuka | 341/22 |
| 5,016,002 | 5/1991 | Levanto | 340/756 |
| 5,266,949 | 11/1993 | Rossi | 341/22 |
| 5,408,060 | 4/1995 | Muurinen | 200/314 |
| 5,436,954 | 7/1995 | Nishiyama et al. | 379/58 |
| 5,521,986 | 5/1996 | Curtin | 382/187 |
| 5,627,948 | 5/1997 | Fukunaga | 345/145 |
| 5,677,949 | 10/1997 | Macor | 379/354 |
| 5,691,716 | 11/1997 | Crowley | 341/22 |
| 5,767,919 | 6/1998 | Lee | 348/569 |
| 5,786,776 | 7/1998 | Kisaichi | 341/23 |
| 5,815,138 | 9/1998 | Tsubaki | 345/145 |
| 5,841,373 | 11/1998 | Mason | 341/21 |

FOREIGN PATENT DOCUMENTS

| | | |
|---|---|---|
| 0 294 518 A2 | 12/1988 | European Pat. Off. . |
| 0294518 A3 | 12/1988 | European Pat. Off. . |
| 0463856 A3 | 1/1992 | European Pat. Off. . |
| 0685953 A1 | 12/1995 | European Pat. Off. . |
| 0715441 A1 | 6/1996 | European Pat. Off. . |
| 87871 | 12/1991 | Finland . |
| 4241815 A1 | 6/1994 | Germany . |
| 2 165 071 | 4/1986 | United Kingdom . |
| WO 93/14589 | 7/1993 | WIPO . |

*Primary Examiner*—Michael Horabik
*Assistant Examiner*—Albert K. Wong
*Attorney, Agent, or Firm*—Perman & Green, LLP

[57] ABSTRACT

A method for forming a character string, an electronic communication device (31) and a charging unit (29) for charging the electronic communication device, wherein the communication device (31) does not comprise at all number/letter keys used for the selection of a phone number. The numbers or letters are selected from a display (39; 41) by means of selecting keys (32–38). The invention can be exploited, for example, in portable mobile phones.

16 Claims, 7 Drawing Sheets

6,052,070

METHOD FOR FORMING A CHARACTER STRING, AN ELECTRONIC COMMUNICATION DEVICE AND A CHARGING UNIT FOR CHARGING THE ELECTRONIC COMMUNICATION DEVICE

BACKGROUND OF THE INVENTION

The invention is related to a method for selecting a phone number in an electronic communication device, an electronic communication device and a charging unit for charging the electronic communication device. The solution according to the invention can be exploited, for example, in portable mobile phones and in their charging devices. In this instance, a phone number is construed to mean in the widest sense all number and character strings which are used in electric data transfer for the identification of the recipient of data It is known that electronic communication devices, particularly mobile phones, are controlled by means of a keypad. Since it is already possible to make the electronical and radio frequency elements of the device very small in size, the number and size of the keys are the factors which largely determine the size of the communication device. For example, the keypad of the mobile phone cannot be infinitely reduced since ultimately the operational convenience will suffer. In the context of this application, a mobile phone is used as an example of a communication device which is equipped with many keys in its conventional implementations and which is equipped with a display.

There are known solutions in which one has tried to find a new kind of way for controlling an electronic communication device. For example, in the patent application WO 93/14589, a phone designed in the form of a pen has been presented, the aim of which has been a completely keyfree phone. According to this solution, the user feeds the necessary data into the phone by using a pressable and rotatable adjuster by which the numbers or letters are selected. The phone shows only a single selected letter or digit on its display at a time. As indicated by the FIGS. 2 and 5 of the WO patent application, the amount of characters which can be displayed by the device is very limited. A better exploitation of the display is not either the aim of said patent application but the display is even smaller than in electronic communication devices according to the prior art in general.

It has been observed that present-day users of a mobile phone make a major proportion of their calls without using the numerical keys for selecting the phone number. An accustomed user has generally programmed the phone numbers he/she most often needs into the memory of the device, and then he/she selects the desired number by means of the menu keys and the display of the phone. It seems probable that this trend will continue as the displays become improved and the amount of memory places increases. Thus the use of numerical keys will be reduced significantly.

In the study which lead to the present invention, one has aimed at finding a new method for the input of data without using the conventional, space requiring integrated keypad built into the mobile phone. The aim of the present invention is to provide an electronic communication device, such as a mobile phone, which has its amount of keys considerably reduced compared to the communication devices which are in current use. Furthermore, another aim of this invention is to find a new method for a better exploitation of the display of the mobile phone. A further aim of the present invention is to make the recording of numbers and names into the memory of the communication device easier and more convenient than present. The aim of the invention is not to totally eliminate the keys but to present a sensible compromise with respect to the number of keys and their ease of use.

Another aim of the present invention is to provide such an electronic communication device and correspondingly such a charging unit for charging the electronic communication device such that by means of them, the above presented problems can be solved and the disadvantages resolved. To achieve this, it is characteristic of the method for forming a character string in a communication device equipped with a display and a keypad according to the invention that said character string is formed in said communication device by selecting the desired characters one at a time in which case for selecting a certain character belonging to said character string several characters are shown simultaneously on said display and a selecting cursor pointing to at least one character, as a response to a certain first key command, said selecting cursor is moved to point to a corresponding character, and as a response to a certain second key command, the character indicated by the selecting cursor is considered as having become selected.

The invention additionally relates to an electronic communication device and, according to the invention, it is characteristic of this device that its keypad consists of scanning keys for scanning of data on the display of the device, display control keys for influencing the representation of data on said display and call control keys for the start and finish of phone connections. By phone connections, this is naturally construed to mean all known speech, telefax and data transfer connections.

SUMMARY OF THE INVENTION

An electronic communication device according to the invention comprises a display or other output device and a brief selection of control and selecting keys. For selection of phone digits and other simple control operations, the device shows on the display the selection of numbers, letters, quick selection numbers and/or operations which are on offer or a menu controlled user interface in which case the user indicates the desired characters, phone numbers or operating options by moving the cursor on the display by using the control keys and determines the selection by a certain selecting key. A natural alternative of moving a cursor in the display is to move the whole field of displayed symbols or a part of it in relation to a cursor that remains stationary. To ensure that the selection of characters by using the cursor and the keys would require as few successive keystrokes as possible, the device sets the characters on the display into groups in a way which is described more accurately later on, and resets the cursor (or the characters, in relation to a stationary cursor) for the start of the character selection to such a place in the character group on the display from where there is a short transfer route to all characters of the group.

In another embodiment, into an electronic communication device according to the invention, quick selections are programmed beforehand and they represent a phone call and/or transmission of some automatic text or sound message to certain important phone numbers. Also graphic images are programmed into the device and they correspond to the quick selections concerned and they can be shown on the display of the device. As the user presses a certain key repeatedly, with each touch the device will show on its display a succession of said graphic images. When there is the appropriate image on the display, the user can make the corresponding quick selection that is initiate a call or transmit a message by pressing a certain start key. This embodiment is called a safety phone from now on.

In the first modification of the above described second embodiment, instead of or in addition to the graphic images, first names of certain recipients or other short identifiers are used, and they are shown on the display as large as possible taking into consideration the total size of the display. This embodiment is particularly suitable for users with failing eyesight.

In the second modification of the second embodiment, instead of or in addition to the graphic images and/or first names displayed in large text, the device has a speech synthesizer which says out loud the name or other sound message corresponding to the quick selection shown on the display at that time and this indicates which recipient the quick selection refers to. The sound message can be recorded as such in a form of digital sampled data into the memory of the device or the speech synthesizer can form it always when needed based on a name stored as letters or on some other identifier corresponding to the quick selection.

With the electronic communication device according to the invention or as a separate accessory, a charging unit is preferably supplied which has a keypad comprising several number and/or letter keys. When the communication device according to the invention has been connected to the said charging unit, said number and letter keys and other control means which the charging unit comprises, can be used for providing more versatile control commands to the communication device. By using the number and command keys of the charging unit, it is possible, for example, to program into the memory of the communication device more phone numbers for future use or to change the preset codes connected to the use of the device, such as the secret code of the customer or the automatic control of the incoming calls to a certain phone answering service. The charging unit comprises in a preferable embodiment also a power supply which is used for charging the battery of the communication device which is connected to it.

The invention is described in detail in the following by referring as an example to the attached Figures in which

DETAILED DESCRIPTION OF THE PREFERRED EMBODIMENTS

Figure 1:
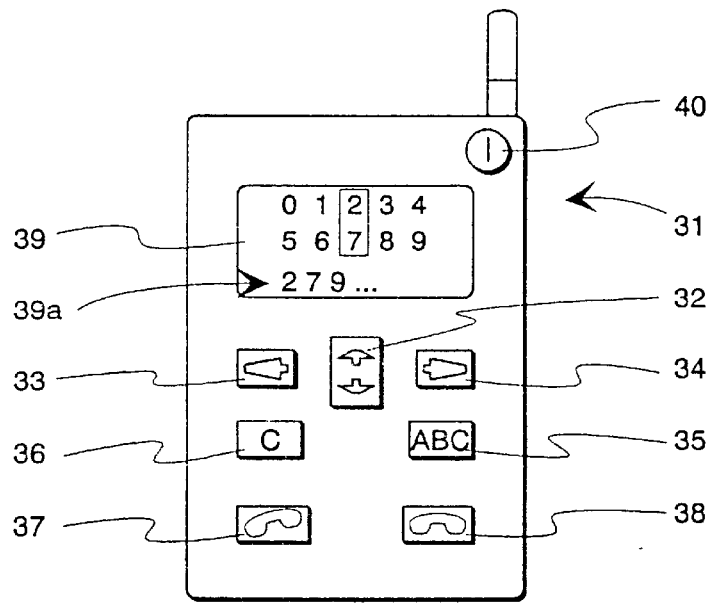
FIG. 1 shows a preferable embodiment of an electronic communication device according to the invention.

FIG. 1 shows schematically a preferable embodiment of an electronic communication device 31 according to the invention and this embodiment comprises a combined rocker-type up-and-down arrow key 32, a left and right arrow key 33 and 34, a letter selecting key 35 and keys 37 and 38 which are needed for the start and finish of the call. In addition, the communication device has a power switch 40 and a display reset key 36 and a display 39. The keys 32–38 are, in a manner known per se, in an electric connection to the unit (not shown in the Figure) which controls the operation of the device and which is preferably a microprocessor in which case the user of the device 31 can feed input data and key commands via said keys 32–38. The unit controlling the operation of the device is also, in a manner known per se, in an electric connection to the display 39 and thus it can show on the display output data which are meant for the user. The device has also a microphone and a loudspeaker (which have not been separately shown in the Figure) so that the device can be considered a telephone.

For describing the function of the keys 32–38 in the embodiment of FIG. 1, an example is shown in the following concerning the use of the device. After switching on the phone by pressing the power switch 40, the user activates the menu operation of the phone by pressing the key 32. Then the text "Number selecting mode" appears on the display, which means that the phone initially prompts as an operating method the selection of the phone number one digit at a time. The user accepts the prompt by pressing again the key 32 in which case the software of the phone recognizes the selection of the number selecting mode and the numbers 0–4 appear on the top row of the display 39 and on the second highest row the numbers 5–9 as has been shown in FIG. 1. The circuit controlling the operation of the display highlights the middle numbers (i.e. 2 and 7) in both rows, for example so that they flash. The highlighting is also called a cursor and its purpose is to remind the user that the highlit number (2) of the upper row can be selected directly by pressing the upper part of the rocker-type key 32 and the highlit number (7) of the lower row can be selected similarly by pressing the lower part of the rocker-type key 32.

The numbers become copied on a certain lower row 39a of the display as soon as they have been selected. If the user wishes to select, for example, number 9, he/she presses the right-hand arrow key 34 twice and as a response the cursor moves two steps to the right, that is, to the numbers 4 and 9. The user selects number 9 by pressing the lower part of the key 32, whereby the selected number 9 becomes copied to the row 39a as a continuation of the earlier selected series of numbers. An embodiment can be presented in which the cursor returns automatically to the middle, that is, to the place of numbers 2 and 7 always when the user has selected a number by pressing the key 32. The purpose of the returning to the middle is to limit the amount of keystrokes needed for the selection of any single digit to three at a maximum. The selection of numbers from the display can also be implemented in such a way that each of the digits 0–9 is visible in a certain place of the display 39 according to cyclic turns for a certain period of time and then, by pressing of the key 32, the desired visible number is selected. If the phone has no display at all, the phone can present the numbers as synthesized sound messages in which case the user selects the audible number coming from the phone by pressing the key 32.

Figure 2:
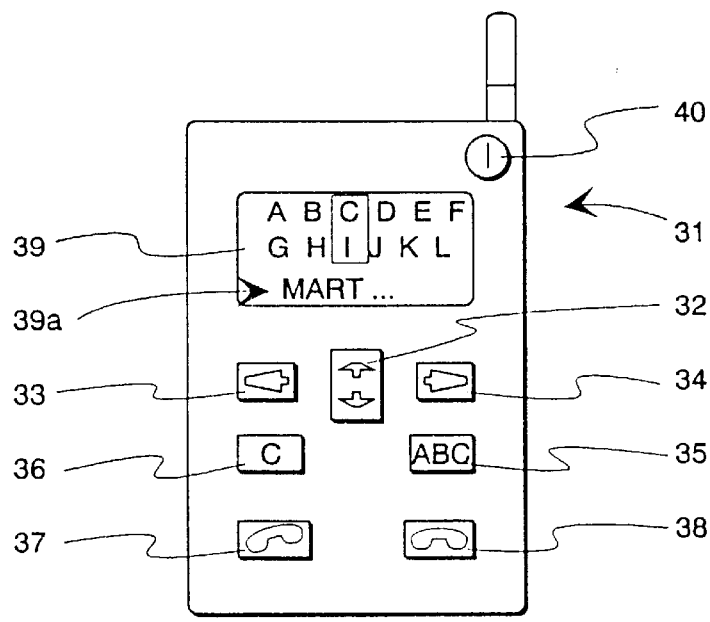
FIG. 2 shows the selection of letters from the display of the electronic communication device according to the invention.

The selection of letters can be implemented in the same way as the selection of digits presented above. FIG. 2 visualizes the selection of letters by using a device according to the embodiment in FIG. 1. The user presses first the letter selecting key 35, whereby the alphabet appear on the display. Since there are more alphabet characters than numbers, there is not enough room for them in two rows and then, for example, more rows can be used or, as shown herein, the phone shows only some of the letters at a time. The beginning of the alphabet is shown first on the display and, in case the user needs the latter part, he/she can get the rest of the alphabet visible by pressing the key 34 or by depressing the lower part of the key 32 for a longer time. The return to the beginning of the alphabet occurs by pressing the key 33 or by depressing the upper part of the key 32 for a longer time. On the display of the phone, the middle letters of the rows are initially highlit. The selection of a letter occurs by moving via the key 33 or 34 in a horizontal direction to the right place, after which the vertical selection occurs by pressing either the upper or the lower part of the key 32. The selected letters become copied as a string to a certain free row 39a. In the selection of both letters and numbers, instead of the horizontal grouping into rows, some other method of setting can be used for grouping of the characters shown by the display 39. The characters can be presented, for example, in vertical columns.

Figure 3:
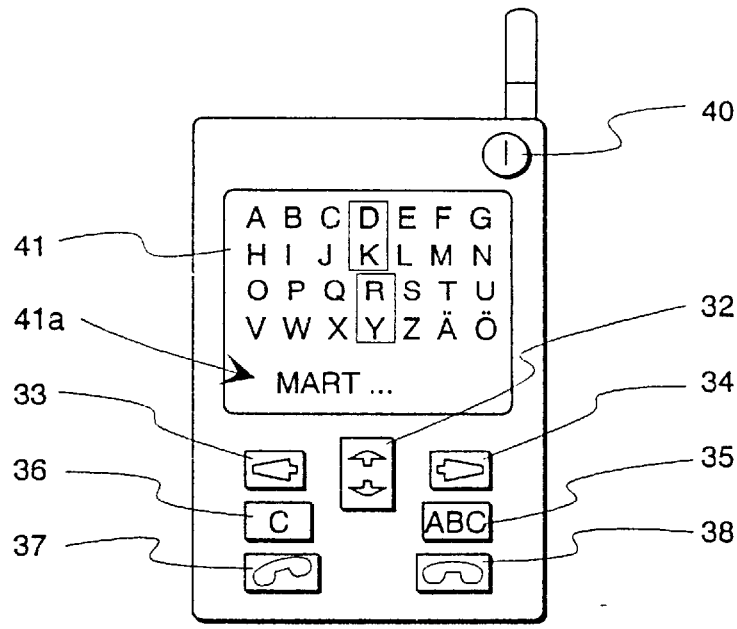
FIG. 3 shows an alternative for the implementation of the electronic communication device according to the invention which has a larger display.

FIG. 3 shows an alternative method for the implementation of an electronic communication device according to the invention with a larger display 41 than in the embodiment shown in FIGS. 1 and 2. Thus there is room for many rows of characters on the display. Keys 32–38 and 40 are the same as before but in this embodiment, all the letters are shown on the display simultaneously. The user may change the cursor from one row to another, for example, by pressing the upper or lower part of the key 32 for a longer time, after which the selection of a letter occurs by shifting horizontally by using the key 33 or 34 to the right place and the vertical selection occurs by using the key 32. The selected letters become copied as a string to a certain free row 41a.

Figure 4:
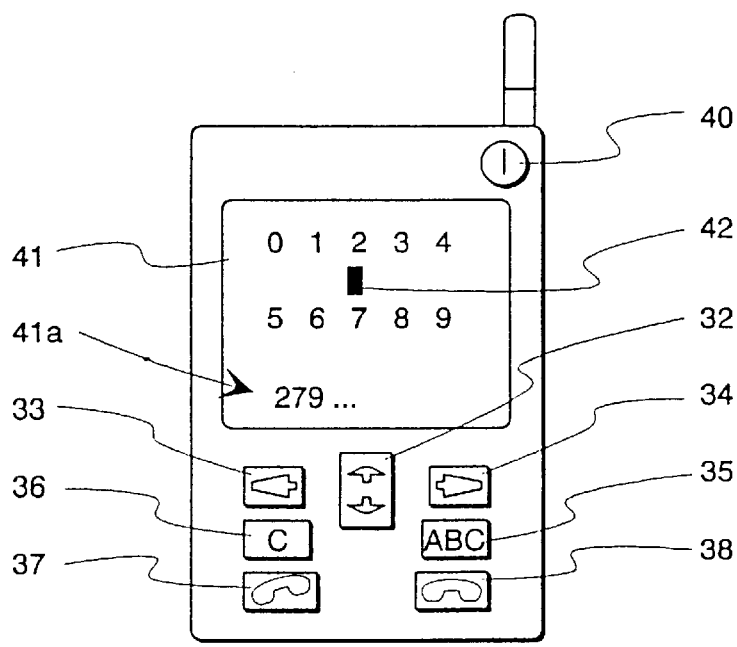
FIG. 4 shows the use of a separate cursor on the display of the electronic communication device according to the invention.

FIG. 4 shows the use of a separate cursor on the display of an electronic communication device according to the invention. The keys and the display are similar to those shown in the embodiment of FIG. 3 but a larger display 41 permits a less tight grouping of the numbers 0–9. The display has a separate cursor 42 and the user selects the desired numbers by moving it horizontally via the key 33 or 34 to the desired number column and by pressing the upper or lower part of the key 32 depending on whether he/she desires to select the upper or lower number of the column. The selected letters become copied as a string to a certain free row 41a of the display.

Figure 5:
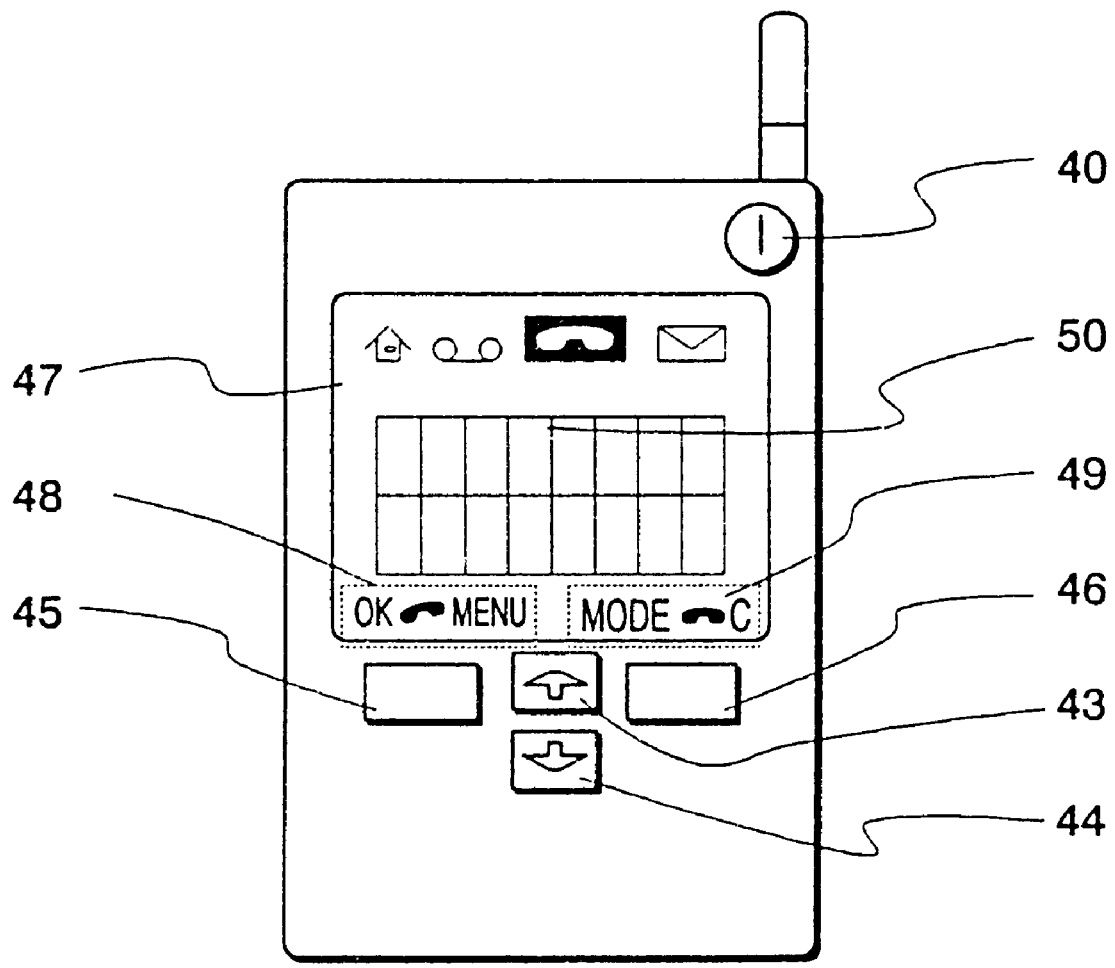
FIG. 5 shows a further alternative for the implementation of the electronic communication device according to the invention.

FIG. 5 illustrates another embodiment of the invention, in which both the number of keys and the size of the display are further diminished from the above-described embodiments. In addition to the power switch 40 there are only four keys, namely the scroll keys ScrollUp 43 and ScrollDown 44, the OK/Accept/Yes key 45 and the Clear/Cancel/No key 46. Of the two latter keys, the denominations OK key 45 and Cancel key 46 will be used for brevity. Note the location of the OK and Cancel keys 45 and 46 next to the display 47, which facilitates the use of changing display symbols 48 and 49 to illustrate the context-dependent function of these keys.

Only one of the display symbols 48 per key 45 (and the display symbols 49 per key 46) should be visible at a time. Therefore the user perceives the OK key 45 as an "OK" key, an "off-hook" (or "start call") key or a "Menu" key depending on which one of the associated symbols 48 is visible in the display, and the Cancel key 46 as a "Mode" key, an "on-hook" (or "end call") key or a "C" key (for "Clear" or "Cancel") depending on which one of the associated symbols 49 is visible in the display. The display also contains space 50 for a number (here sixteen) of simultaneously displayed characters as well as a number of symbols that may be used to indicate the different operational states of the phone to the user. The selection and arrangement of symbols in the display 47 is naturally only exemplary and it is obvious to the person skilled in the art that other symbols might be used and the symbols might be ordered differently without departing from the scope of the invention.

One could also denominate the OK and Cancel keys 45 and 46 with the common designation "softkeys", because their effect to the operation of the phone is context-dependent. Their use, together with the scroll keys 43 and 44 and the display 47 will be discussed next. The OK key 45 is used to accept options, answer and initiate calls and display option lists. The Cancel key 46 is used to reject options, end calls and display a list of modes in idle. The two scroll keys 43 and 44 are used for scrolling back and forth in option lists, texts (for example SMS messages) and other displayed items. In the character space 50 of the display, the phone may show numbers, letters, and special symbols called operators. An operator is a symbolic representation of some function that the phone is about to perform, whereby the user may either accept the function to be performed by pressing the OK key 45 or prevent the function from being performed by pressing the Cancel key 46. As an exemplary operator, the Entry Prompt operator ♦ will be discussed in the following description of a Number Entry mode.

In the Number Entry mode the user may enter a numeric string, adding digits to the end of a string one by one. The numeric string will preferably appear right-justified, conformant to the usual perception of numeric strings. The user will initiate the Number Entry mode by pressing the OK key in a context where it functions as a "Menu" key (the "Menu" symbol of the context-dependent associated symbols 48 is lit), scrolling the consequently appearing list of options with the scroll keys until the option "Number Entry" appears in the display and pressing the OK key, which now appears as an "OK" key (the "OK" symbol of the context-dependent associated symbols 48 is lit). The Entry Prompt operator ♦ appears as the rightmost character in the otherwise empty display 47. The digits from 0 to 9 may now be imagined to form a closed loop of alternative options for entry, together with the Entry Prompt operator ♦. This means that a first keystroke on the ScrollUp key 43 would change the rightmost character in the display 47 into 0, the second keystroke on the ScrollUp key would change the rightmost character in the display 47 into 1 and so on, until after the digit 9 the Entry Prompt operator ♦ would reappear, followed again by 0 and so on. Similarly consecutive keystrokes on the ScrollDown key 44 would cause the same digits to appear in the opposite order. The current rightmost character may also blink in order to remind the user that it is the one under consideration.

When the user presses the OK key 45, the digit currently displayd as the rightmost character is selected. It moves into the next character position to the left from the rightmost character position and the Entry Prompt operator ♦ reappears as the rightmost character. By repeatedly scrolling and selecting one digit at a time the user may formulate a desired numeric string. Each time the selection of a new digit the string of already selected digits is shifted one position to the left. If the user wishes to erase the last digit in the string, he/she presses the Cancel key 46, whereby the Entry Prompt operator ♦ replaces the scrolled digit at the rightmost character position. Alternatively, if the Entry Prompt operator ♦ was already displayed at the rightmost character position, the last digit of the displayed numeric string disappears and the remaining string is shifted one character position to the right.

Figure 6:
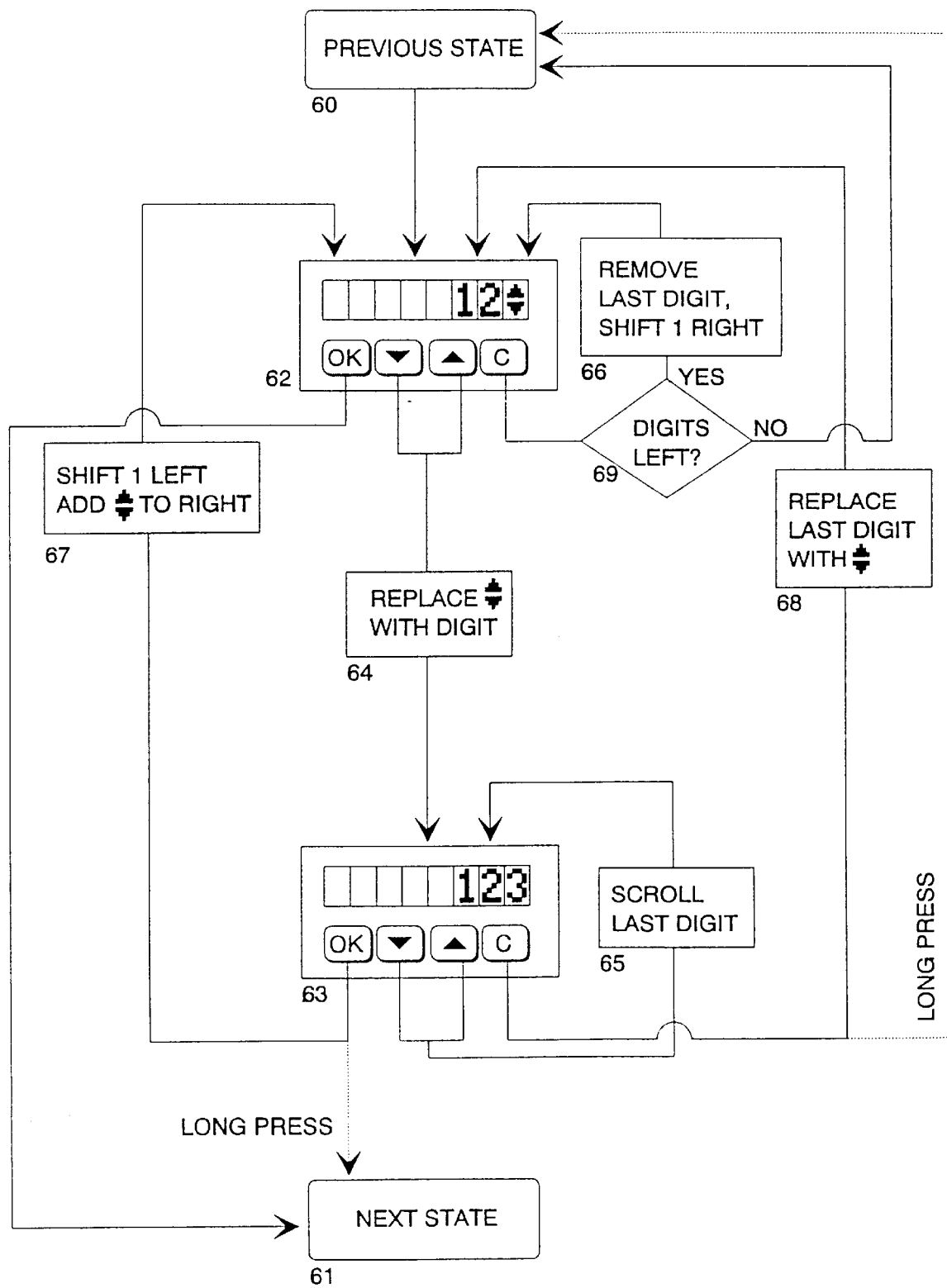
FIG. 6 is a state diagram that illustrates the operation of the device of FIG. 5 in Number Entry mode.

FIG. 6 is a state transition diagram that illustrates the above-explained flow of operation in the Number Entry mode. Previous state 60 and Next state 61 are self-evident. The graphical representations 62 and 63 are equivalent to the keys 43, 44, 45, and 46, as well as the display 47 of FIG. 5 (the display is here simplified to have only eight character positions). Blocks 64, 65, 66, 67, and 68 represent state transitions in response to the keystrokes on those keys from which there is a line to each state transition in question, and block 69 is a decision block where the state transition route diverges in branches according to whether there were digits left in the display when the respective state transition was initiated. The same state transition diagram and functional explanation serves to illustrate a potential Text Entry mode, if we replace "digit" with "letter" in each occasion.

Figure 9:
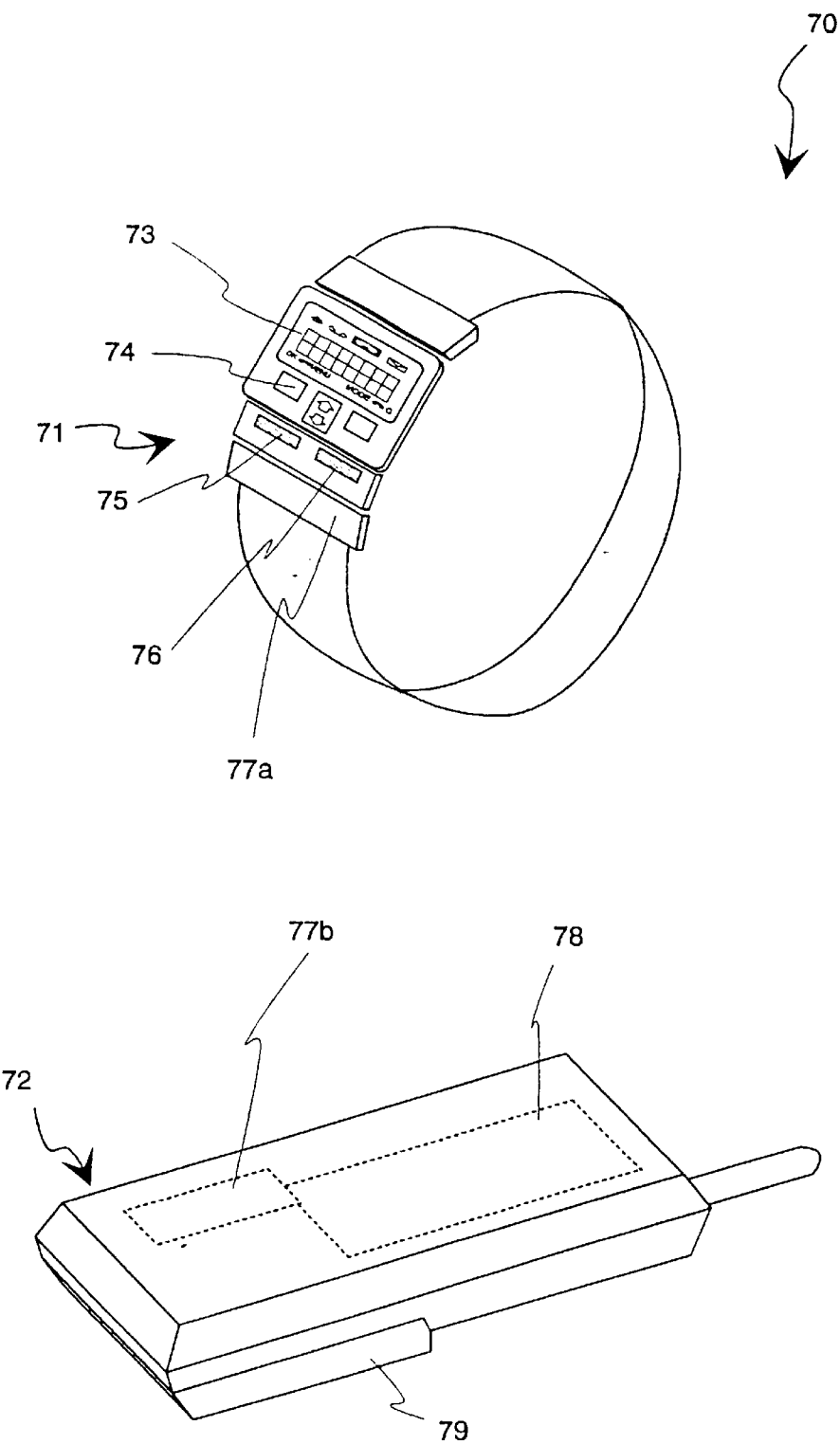
FIG. 9 shows a communication device which has a user interface part and a radio communication part.

The above-explained embodiment of a communication device which has a very small number of keys and which can be realised with a very small display is particularly well suited for a structural solution in which the user interface of a communication device is separate from the rest of the device. FIG. 9 illustrates a communication device 70 which has a user interface part 71 and a radio communication part 72. The former has the appearance of a wrist strap and is meant to be worn on the user's wrist like a wrist watch. It comprises a display 73, a set of keys 74, a microphone 75, a miniature loudspeaker 76 and a short-distance wireless link transceiver 77a. A miniature battery (not shown), a solar cell or a similar power source provides the operating power for the user interface part 71. The radio communication part 72 comprises another short-distance wireless link transceiver 77b, a radio transceiver 78 and a rechargeable battery pack 79. The idea is to realize all the user-related functions of a cellular radio telephone in a separate part that can be carried around with minimal effort and maximal convenience, like on the wrist, in a hat or in a shirt pocket (the user interface part 71 could also be shaped like a credit-card, a pen or the like). The heavier and/or bulkier parts that are necessary for radio communication between the device 70 and a base station (not shown) are located in a separate unit 72 which may be carried in a bag, on the belt or somewhere else where it is near enough the user interface part for the short-distance wireless link 77a, 77b to mediate communication between the two parts but does not require immediate attention or handling during each telephone call. The short-distance wireless link is preferably a low-power radio link, an infra-red link or any other link known as such from prior art.

The idea according to the invention about presenting a certain set of symbols on the display and making some simple selections based on the symbols by using the keys can also be implemented in the form of a safety phone. In earlier safety phones, there are usually fixed symbols on the keys and by pressing them, the user selects a desired, pre-programmed number. The idea of the safety phone according to the invention is that an assistant of the user can program into the phone the numbers needed by the user and associates them with graphic symbols or enlarged names which can be shown on the display, in which case the phone can be used both as an ordinary phone and as a safety phone and no keys need to be reserved for exclusively the operation of the safety phone.

Figure 7:
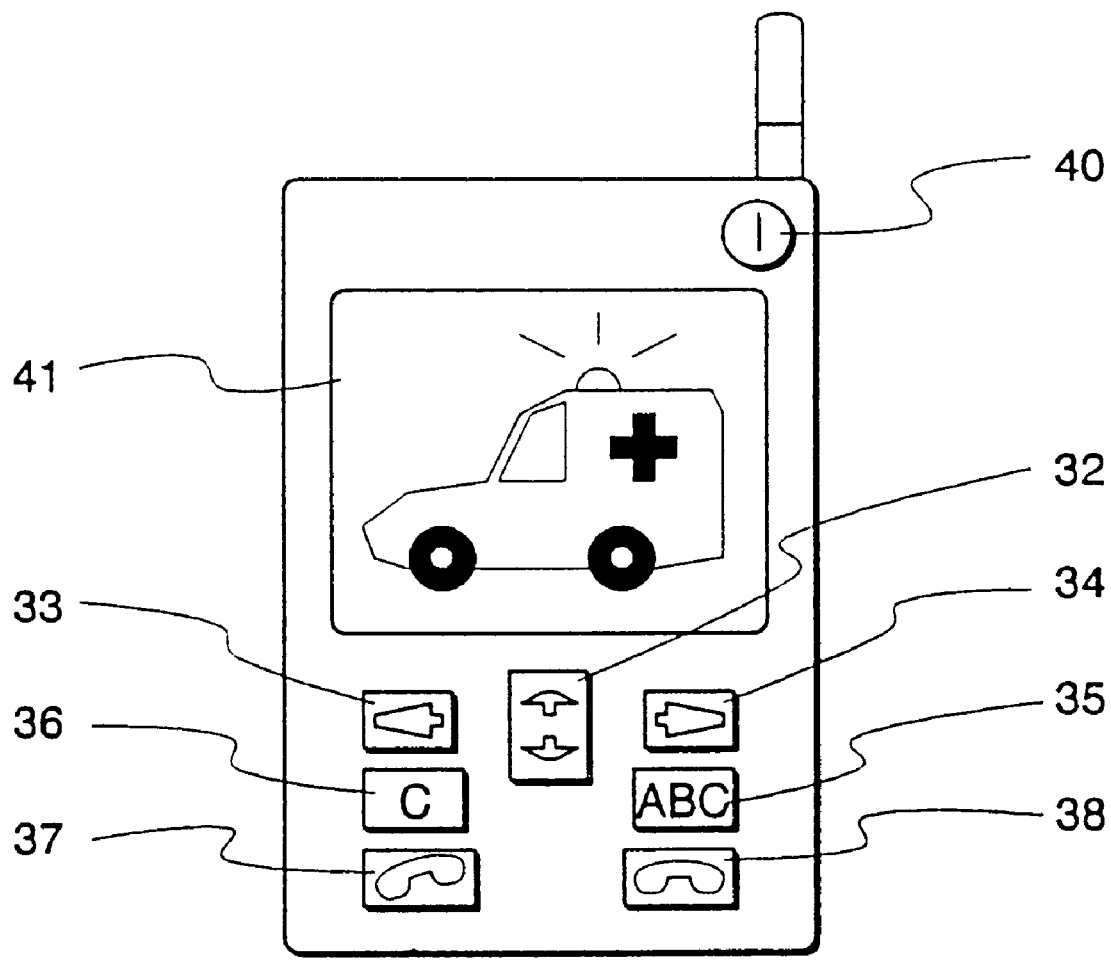
FIG. 7 shows a safety phone which has been implemented by means of the electronic communication device according to the invention.

FIG. 7 shows a safety phone which has been implemented by using an electronic communication device according to the invention. The keys 32–38 and 40 as well as the display 41 are similar to those shown in the embodiment of FIG. 3 which means that the same phone according to the invention can thus be used either as a conventional mobile phone or as a safety phone. Images have been stored into the memory of the safety phone and there can be, for example, 5–15 of them. In practice, there can be as many images as the memory of the phone can store but with respect to the safety phone use, it is preferable to restrict this to only relatively few so that their scanning can be done quickly with as few key commands as possible. The list of contents of the stored images is called a graphics library. The safety phone operation can be taken into use by selecting the respective function label from the menu-formed user interface of the phone that is by pressing in a manner known per se the keys 32, 33 and 34 until the phone shows the text "Safety phone" on the display and by approving of this choice by pressing a certain selecting key. The image symbols which the graphics library contains can be, for example, an ambulance, a fire engine, mother, father etc.

The safety phone is programmed according to the needs or wishes of each user so that the desired numbers have been recorded into the memory and the user can call them without keying the numbers or searching for the names in the menu. The call proceeds, for example, so that the caller presses the key 32 in which case the main symbol wished by the user appears on the display, for example, an ambulance. After that, the user only needs to press the call starting key 37 and then the user obtains a connection to the ambulance service. The connection can be an ordinary phone connection or the phone can transmit an automatic recorded short message, a fax type of message, a data message or a recorded sound message. In case the user wishes to call somewhere else, one can scan the contents of the graphics library in a cyclic order by pressing again the key 32 and then at each keystroke, the next symbol appears on the display 41.

Receiving phone calls by a safety phone proceeds in a conventional way. The graphics library can also be used in the context of the receiving, if the phone receives the information concerning which number the received call originates. If, for example, the mother's picture on a child's safety phone represents the home number and if the mother calls the child's safety phone from home, the phone can show the mother's picture on the display 41 and then the child can see as soon as the phone rings that the call comes from home.

Since in a mobile phone according to the invention in which the amount of keys has been reduced a larger display can be used, the presentation of images is more distinct than in a mobile phone according to the prior art. On the other hand, in the phone according to the invention, larger and clearer keys can be used since space has been saved by removing a great deal of conventional keys away from the actual body of the telephone. As images, any symbols can be used which are well-known to the user. Besides or instead of the picture symbols, it is possible to use the first names of the recipients or other identifiers connected to the recorded quick selection numbers which can be enlarged to the extent that the display allows. The enlarged names are a help to the user with failing eyesight. The safety phone according to the invention can be converted to operate as an ordinary mobile phone if it is not needed for safety use any more.

If there is no display at all in the phone or if the phone is otherwise intended particularly for the use of the visually handicapped, the graphics library is substituted by an audio library which contains recorded sound messages with one or more words. When the user presses the key 32, the phone replays one sound message. The user can start the call to the number corresponding to this sound message by pressing the start key 37 of the call or one can select the next sound message by pressing again the key 32. Sound messages can also be used for supplementing the graphics library in which case, as a response to the pressing of the key 32, the phone outputs both the picture and the sound message connected to it.

In the above presented description and in the claims presented later on, the characteristic of the communication device according to the invention is essentially the small number of keys compared to the conventional mobile phone. For clarity, the keys have then been grouped into scanning keys (the arrow keys), display control keys (for resetting of the display and the letter selecting state) and into call control keys (the starting and the finishing key of the call), and besides them there is a power switch in the communication device. It is clear that the implementations in which keys are used functionally for similar purposes but where they have been grouped differently, are per se obvious and workshop modifications of the invention presented herein and they are thus included in the scope of protection formed by the claims presented later on. With respect to the communication device, it is per se straightforward to supplement keys which are insignificant considering the functions presented herein. Similarly, the keys of the communication device can be reduced to a limited extent by combining the above presented functions so that a short and a long pressing of a certain key or other different ways of depressing the keys cause a different key command corresponding to two different keys of the embodiments presented herein. Furthermore, for example, the number of arrow keys can be reduced by arranging the scanning of the display in such a way that when the user has shifted the cursor by the up arrow key as high up as it is possible on the display, the next keystroke of the up arrow key will shift the cursor to the lowest row of the display (the so-called rotating shift of the cursor). The same method is valid with respect to the horizontal shift of the cursor.

Figure 8:
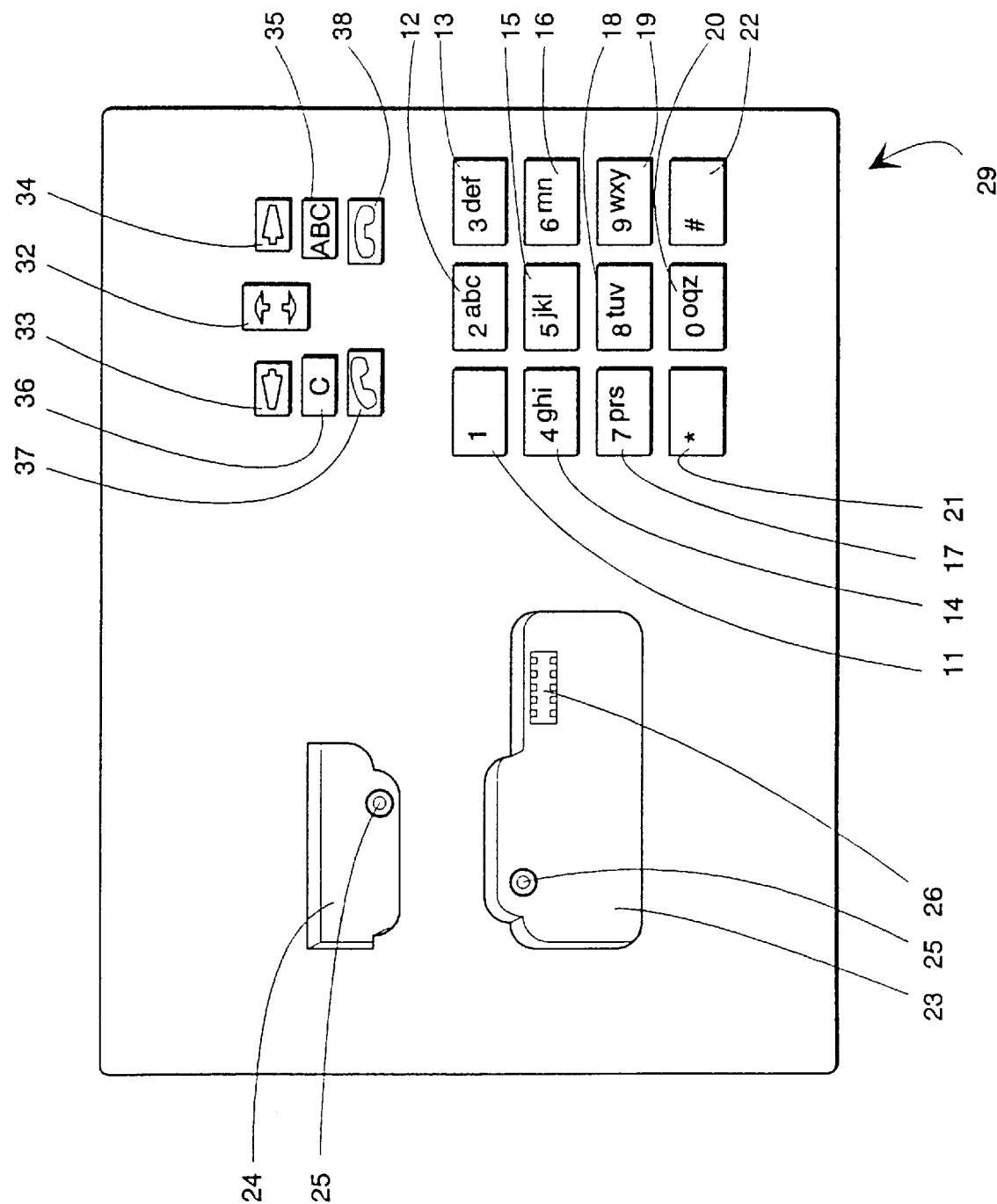
FIG. 8 shows a charging unit according to the invention for charging the electronic communication device.

FIG. 8 shows schematically a preferable embodiment of a charging unit 29 according to the invention. The charging unit has a connector recess 23 for charging the communication device and respectively a connector recess 24 for charging the battery of the communication device. The connector recess 23 which is meant for a communication device has a charging current connector 25 for feeding the electric power and a data connector 26 for the implementation of data transfer between the communication device and the charging unit. The communication device (not shown in the Figure) has counterparts for these connectors, and thus, when the communication device is connected to the charging unit 29, both data and electric power can be transmitted between them. Number/letter keys 11–22 are included in the charging unit. Furthermore, in the charging unit there are menu keys 32–34, a letter selecting key 35, keys 37 and 38 needed for the start and the finish of a call and a display reset key 36. Keys 32–38 are similar in their purpose of use as the respective keys in the communication device 31 shown in FIGS. 1–4 and 7.

The user is expected to record the data about desired phone number and name as well as procedure options into the memory of the phone by means of the user friendly keypad which is part of the charging unit. The charging unit contains a coder circuit (not shown in the Figure) and by using it, the keystrokes are coded into a suitable form, for example, into a serial form for transmitting them via the data connector 26 to the circuit controlling the operation of the phone and further, to the memory of the phone. The invention can also be applied in such a way that the user types the desired name and number data by using a personal computer and transfers them by means of a bus cable which is available as an accessory, to the memory of the phone. When the phone is connected to the charging unit 29, the two devices form a single unit which can also be used as a desk phone or as a wireless phone in which case the user can key in the desired phone number directly by means of number keys 11–22 and use the phone as the handset of the device. To facilitate this operation, the data connector 26 can be substituted by an infrared connection or by some other wireless connection When the number keypad 11–22 has been transferred to be a component of the charging unit, it can be made cheaper since its durability need not be of the same quality standard as that of the keypad of a portable mobile phone which must be able to withstand continual wear and use. Lighting is not either necessarily needed in the keypad of the charging unit and there are less mechanical restrictions to be considered in its design, for example, with respect to its size. Since the size is not a restriction, the keypad can be made versatile and user friendly, for example, by allocating each letter its own key. Also the ergonomics of the keypad can be taken better into consideration than if the keypad were a part of a small-sized mobile phone.

Many advantages can be achieved by reducing the amount of keys in a mobile phone. It makes possible to make a phone which is smaller in size and provides novel possibilities for the design. The phone can be made, for example, flatter or narrower, or the necessary keys can be placed on the phone in an entirely new way, for example, on the side of the phone. However, one has to bear in mind that a good technical solution for a miniaturized radiocommunication device is a compromise between number of keys, size of display, and user-friendliness.

New solutions can be used also for the display. A larger display can be used or it can be placed horizontally and not vertically, as is usual. On a larger display also more information can be placed and it will still be visible or larger characters can be used, for example, when users with poor eyesight are concerned. The limiting of the amount of keys gives possibilities also to new mechanical solutions and as a consequence, the telephone will be easier to assemble and its construction will be cheaper. When necessary, the phone is easier to make dust and/or water tight since its casing has less openings.

Even if the charging device according to the invention provides a way to enter alphanumeric strings into the memory of the telephone, it is highly probable that the user will also encounter a situation in which he/she wants to enter some alphanumeric strings without the charging device being available. The exclusion of (alpha-)numeric keys from the telephone might make it more time-consuming for the user to construct, for example, a person's name to be entered into a telephone directory type memory location, when compared to the methods of prior art. A solution that would make the entering of first names easier in a telephone according to the invention is briefly discussed below.

The available choice of first names is language-dependent. The factory-loaded information in the telephone's memory could include a table of first names in each language that is available as the operating language. Alternatively such tables of first names might be available in separate memory modules that can be removably connected to the telephone. The table of first names in each language should be ordered in alphabetical order. When the user initiates a Name Selection mode, a letter A (or any other letter) appears in the display. The user may now use the scroll keys to scroll into the display the first letter in the name he/she wants to enter. When the letter in the display is correct, the user presses the OK key, which causes the telephone to check, which language is in use as the operation language, and to display one name from the list of stored first names that start with the selected letter in the current language. To limit the selection of names, an alternative embodiment may be used in which the user first scrolls and selects two (or more) consecutive first letters of the desired name and only thereafter the scrollable list of names that start with those letters appears. Again the user may use the scroll keys to select from the ordered list of names the one which he/she wishes to enter. When the name in the display is correct, a press on the OK key will store it into the desired memory location. Afterwards, the user may initiate the Number Entry mode, select the memory location into which the selected name was recently stored, and enter a corresponding telephone number.

A still further developed alternative from the scrollable list of names would be a method in which, once the user has selected the correct first letter or first letters, the telephone automatically scrolls through the whole list of first names that start with the selected letter(s), and displays each one of them in turn. During the period when each name appears in the display, the user may press the OK key to accept it or the Cancel key to reject it. The idea is that whenever the user realizes that the name in the display corresponds to somebody he/she knows, he/she stores the name into memory for future use. When this round of name selection is complete, the telephone may move automatically (or as a response to a separate command) into the Number Entry mode, in which it displays the selected names one at a time, whereby the user may enter a corresponding telephone number to complete his/her electronic telephone directory.

It is clear for a person skilled in the art that the above presented embodiments concerning the location, the relative size, the design and the amount of keys and displays as well as the presented forms of use including keystrokes and messages shown on the display are meant as examples. The invention can be easily modified within the frame of the claims presented subsequently, without departing from the innovative idea itself For example, part of the keys mentioned in the description above or all the keys can be included in a manner known per se in the display being sensitive to touch, in which case no separate keypad is needed in the phone and/or in the charging device.

We claim:

1. A method for forming a character string in a communication device comprising the steps of:
   a) displaying a two-dimensional array of characters;
   b) displaying a selecting cursor that simultaneously refers to two characters in said two dimensional array of characters;
   c) repeating the steps of:
      c1) as a response to a first command, displaying a relative movement of said selecting cursor and said two-dimensional array of characters in a first direction; and
      c2) as a response to a second command, displaying a relative movement of said selecting cursor and said two-dimensional array of characters in a second direction opposite to said first direction until the reception of a selection command corresponding to one of two allowed values;
   d) depending on which one of the allowed values the selection command corresponded to, indicating one of the characters currently referred to by the selecting cursor as selected, and
   e) repeating steps a) and d) until the reception of a character string completion indication.

2. A method according to claim 1, wherein
   said two-dimensional array of characters consists of an upper character row and a lower character row;
   said selecting cursor refers to a column consisting of one character in said upper character row and an adjacent character in said lower character row;
   in step c1, said relative movement corresponds to moving said selecting cursor leftward by one character and
   in step c2, said relative movement corresponds to moving said selecting cursor rightward by one character.

3. A method according to claim 2, additionally comprising between steps d) and e) the step of d) displaying a relative movement of said selecting cursor and said two-dimensional array of characters that places said selecting cursor into a central position in relation to said two-dimensional array of characters that places said selecting cursor into a central position in relation to said two-dimensional array of characters.

4. A method according to claim 1, additionally comprising under step c) the substeps of
   c3) as a response to a third command, displaying a relative movement of said selecting cursor and said two-dimensional array of characters in a third direction perpendicular to said first and second direction
   c4) as a response to a fourth command, displaying a relative movement of said selecting cursor and said two-dimensional array of characters in a fourth direction opposite to said third direction.

5. A method according to claim 2, additionally comprising between steps a) and b) the step of
   a') as a response to a character set change command, replacing the characters displayed in said two-dimensional array of characters with other characters.

6. A method according to claim 1, wherein in step d) a character is indicated as selected by displaying a copy of it outside said two-dimensional array of characters.

7. A method for forming a character string in a communication device, comprising the steps of
   a) establishing an organized list of allowable characters,
   b) displaying an array of character spaces,
   c) displaying a selecting cursor at a certain first character space,
   d) repeating the steps of
      d1) as a response to a first command, replacing the current contents of said first character space with a character, which character is obtained from said list of allowable characters by advancing into a first direction within said list of allowable characters and
      d2) as a response to a second command, replacing the current contents of said first character space with a character, which character is obtained from said list of allowable characters by advancing into a second direction within said list of allowable characters, where said second direction is opposite to said first direction, until the reception of selection command, e) displaying a selecting cursor at a certain second character space adjacent to said first character space and f) repeating steps d) and e) until the reception of a character string completion indication.

8. An electronic communication device for making and maintaining telephone connections, comprising a display, means for displaying a two-dimensional array of characters in said display, means for displaying a selecting cursor in said display so that it simultaneously refers to two characters in said two-dimensional array of characters, first command input means for causing a relative movement of said selecting cursor and said two-dimensional array of characters in a first direction, second command input means for causing a relative movement of said selecting cursor and said two-dimensional array of characters in a second direction opposite to said first direction and double-acting selection command input means for giving a selection command having selectively either a first allowed value for indicating a first character referred to by said selecting cursor as selected or a second allowed value for indicating a second character referred to by said selecting cursor as selected.

9. An electronic communication device according to claim 8, wherein said first command input means is a first horizontal arrow key and said second command input means is a second horizontal arrow key.

10. An electronic communication device according to claim 9 wherein said double-acting selection command in input means in a double-ended vertical arrow key.

11. An electronic communication device according to claim 9, wherein said double-acting selection command input means is a set of two adjacent vertical arrow keys in opposite directions.

12. An electronic communication device according to claim 8, additionally comprising a display reset key for resetting said display.

13. An electronic communication device according to claim 8, additionally comprising a character changing key for replacing the characters displayed in said two-dimensional array of characters with other characters.

14. An electronic communication devices according to claim 8, comprising a number of context-dependent softkeys and means for displaying in said display symbols for indicating the current function of said softkeys.

15. An electronic communication device according to claim 8, comprising a user interface unit and a radio communication unit separate from said user interface unit and equipped for establishing and maintaining a short-distance communication connection with it, wherein said display and said command input means are located in said user interface unit.

16. An electronic communication device according to claim 15, wherein said user interface unit comprises a strap for removably attaching it to a part of the body of a human user.

* * * * *